US007159469B2

(12) United States Patent
Claude et al.

(10) Patent No.: US 7,159,469 B2
(45) Date of Patent: Jan. 9, 2007

(54) PORTABLE ELECTRONIC APPLIANCE INCLUDING A PRESSURE SENSOR

(75) Inventors: Stéphane Claude, Grenchen (CH); Vincent Brunner, Les Reussilles (CH)

(73) Assignee: ETA SA Manufacture Horlogère Suisse, Grenchen (CH)

( * ) Notice: Subject to any disclaimer, the term of this patent is extended or adjusted under 35 U.S.C. 154(b) by 220 days.

(21) Appl. No.: 11/013,352

(22) Filed: Dec. 17, 2004

(65) Prior Publication Data

US 2005/0132815 A1 Jun. 23, 2005

(30) Foreign Application Priority Data

Dec. 17, 2003 (EP) .................................. 03028955

(51) Int. Cl.
*G01L 7/00* (2006.01)
*G04B 47/06* (2006.01)

(52) U.S. Cl. .......................................... 73/756; 368/11

(58) Field of Classification Search .................. 73/723, 73/718, 720, 754, 756; 368/11; 600/490; 324/663
See application file for complete search history.

(56) References Cited

U.S. PATENT DOCUMENTS 3,198,013 A * 8/1965 Erdely ......................... 73/723
4,331,154 A * 5/1982 Broadwater et al. ........ 600/490
5,592,442 A * 1/1997 Nishikawa et al. ........... 368/11
5,802,016 A * 9/1998 Kubota et al. ................ 368/11
6,606,911 B1 * 8/2003 Akiyama et al. ............. 73/718

FOREIGN PATENT DOCUMENTS

EP 0195636 A1 * 3/1986

* cited by examiner

*Primary Examiner*—Jewel V. Thompson
(74) *Attorney, Agent, or Firm*—Sughrue Mion, PLLC

(57) ABSTRACT

In an electronic apparatus worn on the wrist such as a diver's wristwatch or an altimeter, a pressure sensor (10) is mounted from the exterior in a housing (11), located in one flank (9) of the case (2) of the apparatus and closed by a cap (13) provided with at least one orifice (32) for transmitting the ambient pressure towards said housing. The sensor is mounted in the housing by means of a sealing gasket (12). A protective screen (14) is placed between the central wall (31) of the cap and the exposed surface (22) of the sensor, in order to prevent solid bodies and/or solar light being able to damage the sensor. Preferably, this screen is formed by a perforated plate fixed to the cap and whose holes (42) are shifted laterally with respect to each orifice (32) of the cap, such that all of the transmission paths of the ambient pressure from the exterior to the exposed surface of the sensor are sinuous.

13 Claims, 5 Drawing Sheets

PORTABLE ELECTRONIC APPLIANCE INCLUDING A PRESSURE SENSOR

This application claims priority from European Patent Application No. 03028955.7 filed Dec. 17, 2003, the entire disclosure of which is incorporated herein by reference.

BACKGROUND OF THE INVENTION

The present invention concerns an electronic apparatus which can be worn on the wrist, particularly a diver's wristwatch, a bathymeter or an altimeter, including a case and a pressure sensor, which is mounted in a housing of the case and has a surface exposed to the inside of the housing for receiving the ambient pressure, said housing opening out on to an external face of the case and being closed on said face by a cap having an external wall provided with at least one orifice in front of the housing for transmitting the ambient pressure from outside the case to the housing.

A wristwatch of this type is known, disclosed in EP Patent No. 195 636, wherein the housing of the pressure sensor is provided in a lateral projection of the case and opens onto the upper face of the case, such that the sensor can be set in place from the top. According to one construction, which is currently the most common, the pressure sensor includes a piezo-resistive element made of silicon which is housed in a pot-shaped structure and encased in a silicon gel to protect it from the effects of water. This gel is also coated with a flexible layer of silicon resin or rubber, which forms the exposed surface of the sensor and which transmits the ambient pressure to the piezo-resistive element. Above, the cap closing the recess is formed by a perforated circular plate. The orifices of the plate are arranged along its periphery, so as not to be opposite the silicon element and the gel encasing the latter. The object of this arrangement is to prevent foreign bodies engaging in these orifices from being able to damage the silicon element or gel.

However, such an arrangement has two drawbacks. On the one hand, it means that the closing plate has to be enlarged so that the orifices are outside the central region occupied by the sensor. On the other hand, it would be desirable to avoid the silicon element having prolonged exposure to solar light, but the construction described hereinbefore does not sufficiently stop diffusion of light in the sensor.

EP Patent No. 677 798 discloses a wristwatch of the type indicated in the introduction hereinbefore, but in which a pipe placed in a cavity at the back of the watchcase forms the housing for the pressure sensor. In order to prevent the pressing of the case against the wearer's wrist interfering with transmission of the ambient pressure to the sensor, the back of the case includes grooves, whereas the housing is covered by a cover or lid having, on the outside, a support surface flush with the back of the case, for pressing against the wearer's wrist and leaving communication between the grooves and the sensor housing behind the cover or through its lateral openings. Such a construction has the drawback of leading to great thickness of the watch. On the other hand, it is not arranged to prevent solar light reaching the sensor, particularly when the watch is not on the wrist.

SUMMARY OF THE INVENTION

It is an object of the present invention to overcome the aforementioned drawbacks of the prior art, owing to a particularly simple and efficient arrangement of the members for mounting the sensor in its housing. One particular object consists in designing the members so as to simplify to a large extent the assembly of the sensor and the components of the apparatus associated therewith, in particular with a view to automated assembly.

The invention therefore concerns a portable electronic apparatus of the type indicated hereinbefore, characterised in that said external face of the case is located on a side of the case that is not in contact with the wearer's wrist and in that at least one protective screen is arranged in the housing behind the orifice or orifices of the cap so as to prevent any straight line communication between the orifice or orifices of the cap and the exposed surface of the pressure sensor, such that the transmission path of the ambient pressure to the exposed surface of the sensor is sinuous.

Thus, the protective screen provided in this invention provides double protection for the sensor, i.e. against solid bodies and against the light, with a construction that can be extremely simple and compact, for example with the addition of a plate having perforations carefully arranged under the cap closing the housing of the pressure sensor. Moreover, this construction advantageously enables the external orifice or orifices of the cap to be placed in front of the exposed surface of the sensor, thus in the central region of the cap, which enables the external dimensions and visual impact of the cap to be reduced. The side of the case comprising the sensor housing may be a lateral face or the top face of the case as well.

According to a very simple and inexpensive embodiment, particularly if the cap is a moulded plastic part, the protective screen can be formed by a perforated plate extending substantially parallel to said wall of the cap, the holes in the perforated plate being shifted laterally with respect to each orifice of the cap so that an orthogonal projection of the orifice or orifices onto the perforated plate is spaced apart from the holes therein.

Other features and advantages of the invention will be better understood using the following description of a currently preferred embodiment, given by way of non-limiting example with reference to the annexed drawings.

DETAILED DESCRIPTION OF AN EMBODIMENT OF THE INVENTION

Figure 1:
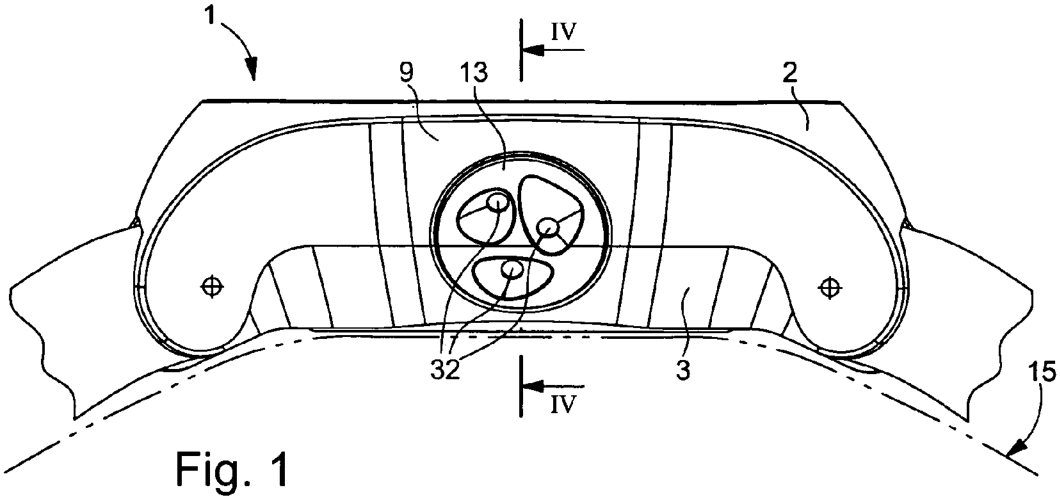
FIG. 1 is a side view of a wristwatch including a pressure sensor and arranged in accordance with the principles of the present invention.

With reference to FIGS. 1 to 4, a diving wristwatch 1 has a case 2 made of rigid synthetic material which contains, in particular, an electronic watch movement, a pressure sensor sensitive to the ambient pressure prevailing outside the case, analogue and/or digital display members and electronic circuits for processing the pressure date and displaying the results via display means. Case 2 includes a middle part 3 made of synthetic material, surrounding a central cavity 4 (FIG. 4) which is closed at the bottom by a back cover 5 and at the top by a glass 6 bordered by a bezel 7. Central cavity 4 contains the main components of the diving watch, particularly the printed circuit board 8 which carries the main electronic circuits of the watch.

Figure 2:
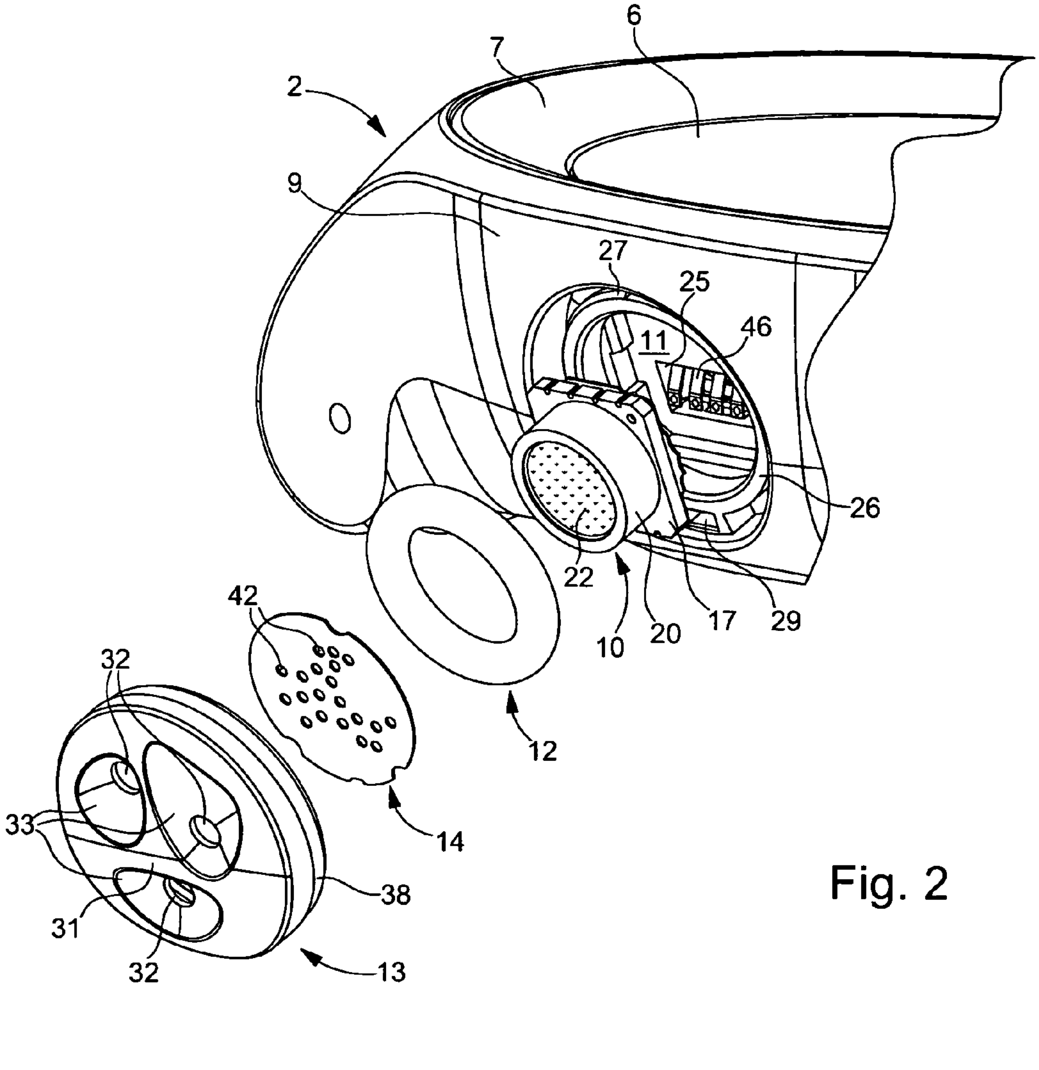
FIG. 2 is an exploded perspective view showing the pressure sensor and the elements for mounting it in the watchcase of FIG. 1.
Figure 4:
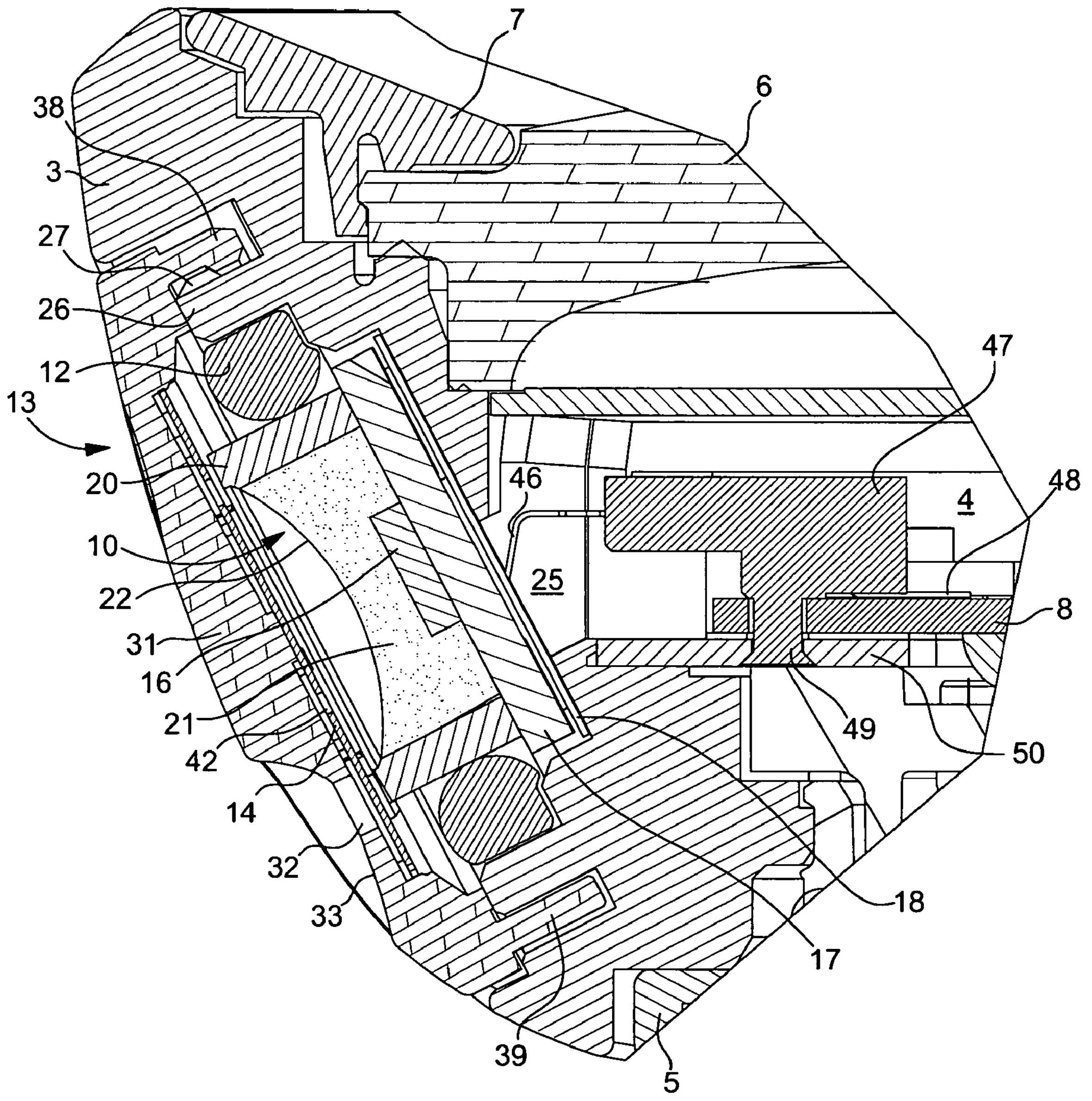
FIG. 4 is a partial cross-section of the watch along the line IV—IV of FIG. 1.

As can be seen particularly in FIGS. 2 and 4, pressure sensor 10 is placed in a housing 11 arranged in middle part 3 and opening out onto the left external face 9 of case 2, so that the sensor can be mounted in the housing from the outside of the case. Sensor 10 is held in this housing using two elements shown in FIG. 2, namely an O-ring sealing gasket 12 and a cap 13, and it is also protected by a screen formed here by a perforated plate 14 mounted inside cap 13. Outside, the surface of cap 13 is preferably, but not necessarily, flush with the external lateral face 9 of the case. This face is never in contact with the user's wrist 15 when the wristwatch is being worn, so that the ambient pressure reaches this surface of the cap without any interference, whether in the air or in the water.

The construction of pressure sensor 10 is known. It includes a piezo-resistive element 16 made of silicon, mounted on a square substrate 7 made of ceramic material provided with conductors, which connect element 16 to contact bumps arranged on the back of the substrate. These bumps make a contact with a printed circuit film 18 applied behind substrate 17. Sensor 10 further includes a cylindrical side wall 20, which is fixed to the front face of substrate 17 and forms therewith a pot-shaped structure which surrounds silicon element 16, which is encased in a silicon gel 21 whose front surface 22 forms the exposed surface of the sensor, for receiving the ambient pressure.

Figure 3:
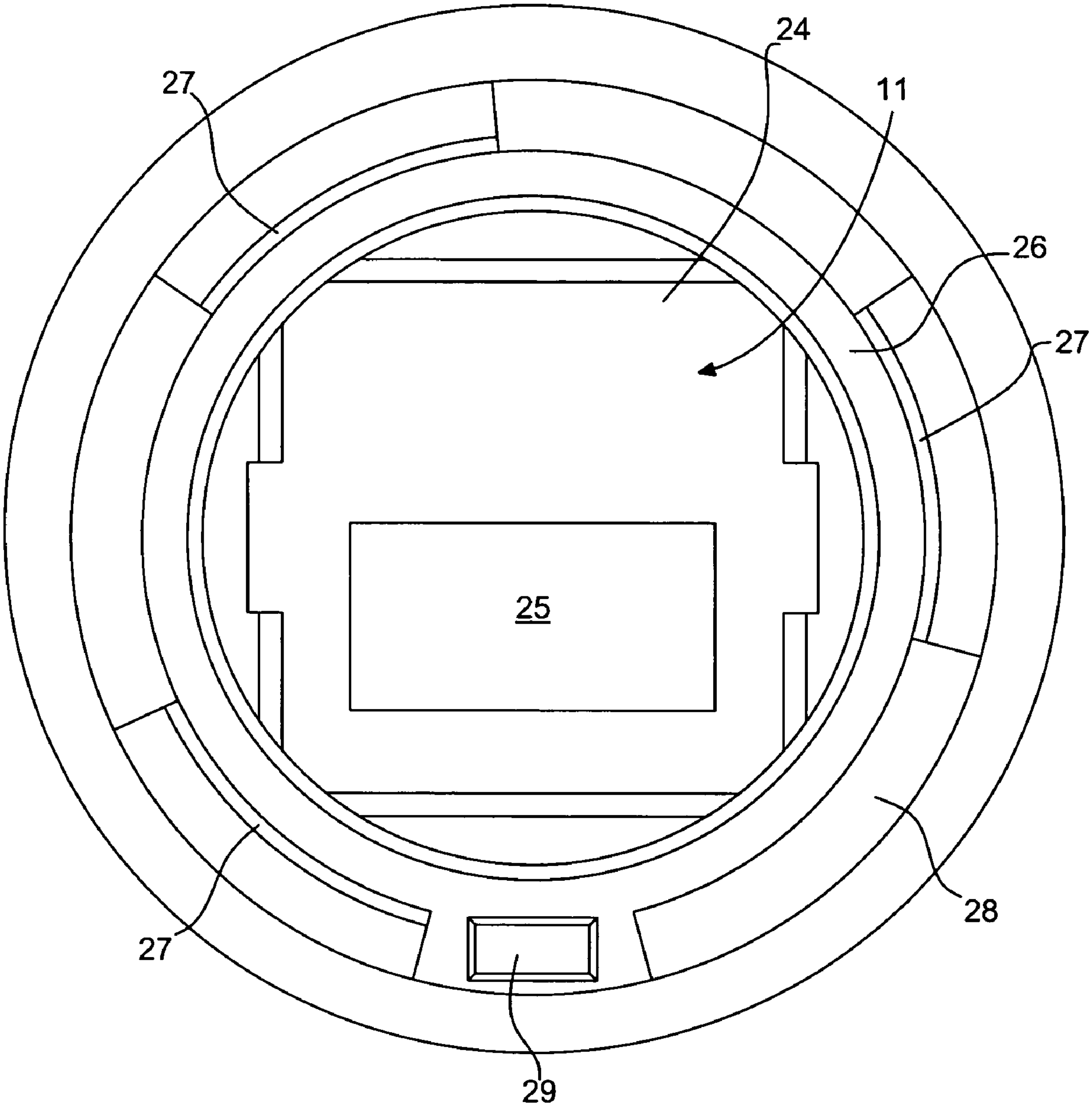
FIG. 3 is a front view of the housing for the pressure sensor.

As can particularly be seen in FIG. 3, housing 11 provided for the sensor in the middle part of the case has a bottom wall 24 that is flat and substantially square, against which the sensor structure and printed circuit film 18 abut and in which there is arranged an aperture 25 which forms a communication between housing 11 and central cavity 4. Housing 11 is delimited laterally by a circular projecting wall 26 having a discontinuous radial edge 27 on its external surface. This edge extends into a groove 28 which surrounds wall 26 over its entire circumference, except in one sector provided with a blind guide hole 29.

Elastomeric sealing gasket 12 is placed around side wall 20 of the sensor and it is compressed radially between this wall and projecting wall 26 of housing 11. It thus not only seals, but also provides an elastic suspension protecting the sensor against any shocks that the case might undergo.

Figure 5:
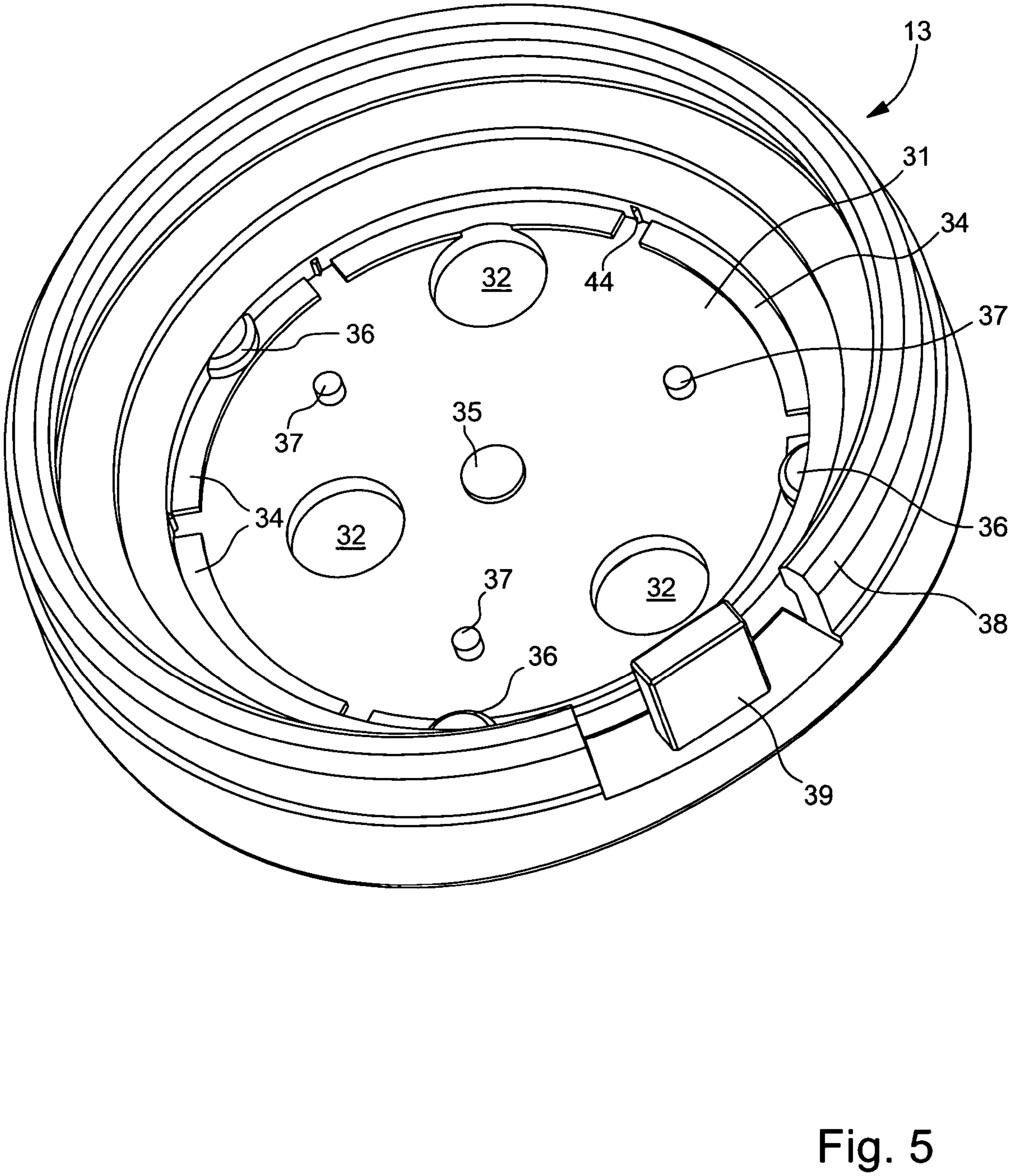
FIG. 5 is a perspective view of the rear face of a cap shown in FIG. 2.

As can be seen in particular in FIGS. 2 and 5, cap 13 is preferably an opaque part of moulded synthetic material or provided with an opaque coating. It includes, in its central region, an external wall 31 in the form of a circular plate of variable thickness, through which three orifices 32 pass, which have a diameter of around 1.5 mm in this example. These orifices open out externally into respective concave surfaces 33 the effect of which is both decorative and functional, to prevent the orifice being easily obstructed by a flat foreign body. On its inner face, wall 31 of the cap has prominent surfaces 34 and 35 for pressing protective plate 14, lateral shoulders 36 for wedging the plate sideways, and three dog points the function of which will appear hereinafter. The periphery of cap 13 includes a circular edge 38 arranged for hooking onto the external edge 27 of wall 26 of the sensor housing, such that cap 13 can be simply snapped fitted onto case 2. Thus, the cap is securely fixed, but can be removed if sensor 10 has to be changed. The cap further includes a guide finger 39 that engages in hole 29 to guarantee proper orientation of the cap, thus the desired position of its three orifices 32.

Figure 6:
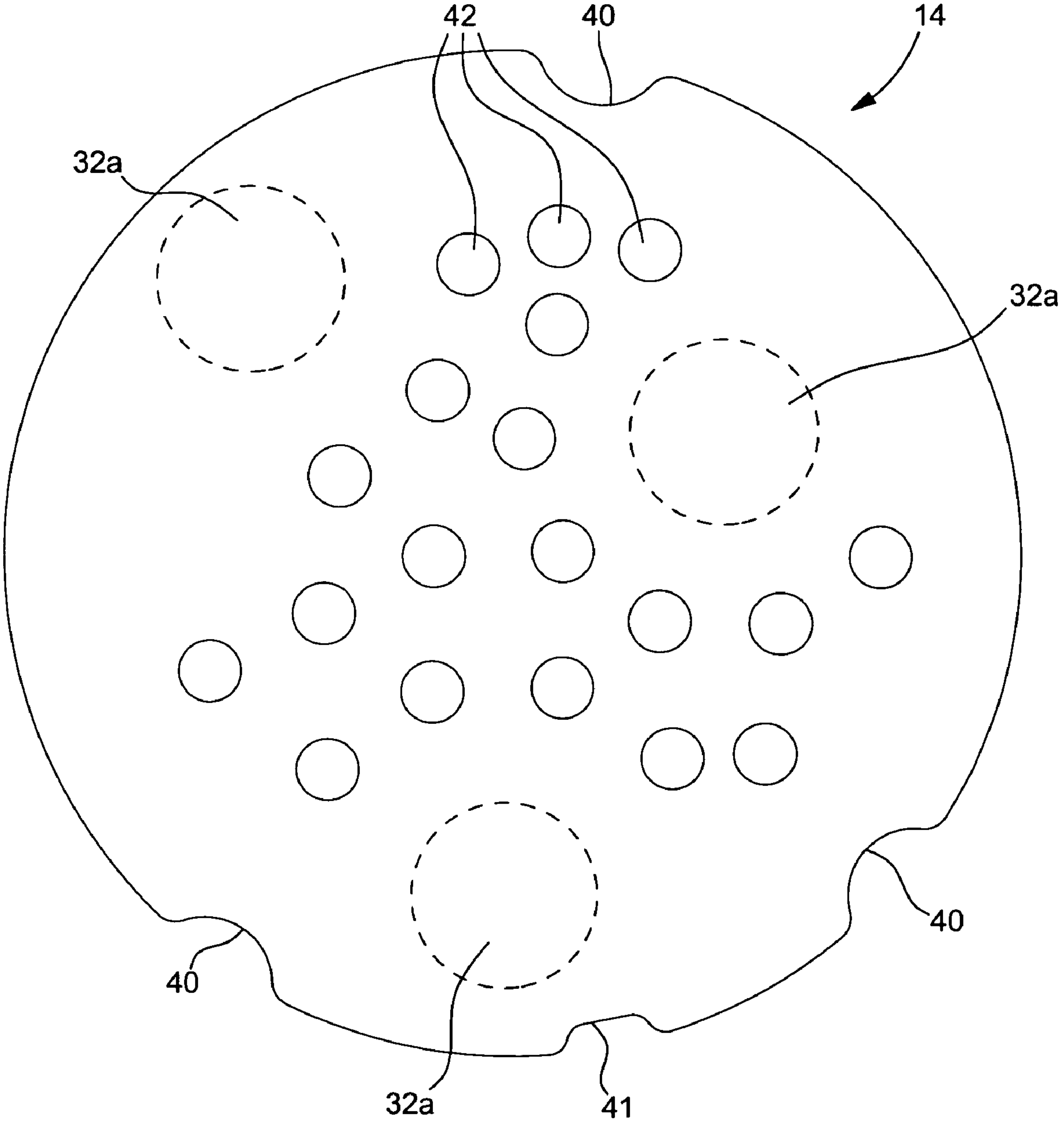
FIG. 6 is a front view of a protective plate shown in FIG. 2.

FIG. 6 shows in more detail the configuration of protective plate 14, which is, in this example, a simple circular plate made of quite rigid synthetic material, for example Kapton®, but it could be made of any rigid material that is corrosion-resistant, particularly in the presence of sea water. Three orientation recesses 40 for cooperating with shoulders 36 of cap 13, and an identification recess 41 used for the mechanised positioning of the plate in the cap. Recess 41 can also be used for visual identification if the plate is set in place manually. Small projecting parts 44 (FIG. 5) are formed on the inside of the cap to hold plate 14 via their elasticity.

Plate 14 is pierced with a plurality of holes 42 to allow the ambient pressure to be transmitted towards sensor 10. In the present example, twenty or so holes 42 are provided with a diameter of approximately 0.5 mm. All of these holes are considerably shifted laterally with respect to orifices 32 of cap 13, the perpendicularly projected position of these orifices on plate 14 being represented in FIG. 6 by three circles 32*a*. Holes 42 are distributed over plate 14 in such a way that none of them is located at less than 0.75 mm from one of circles 32*a*. It will also be noted that three of holes 42 are arranged so that dog points 37 of the cover pass through them, said dog points being able to abut against the front face of cylindrical wall 20 of sensor 10 in order to hold the latter in its housing.

Once it is set in place inside cap 13, protective plate 14 is at a constant distance of around 0.1 mm from wall 31 of the cap. Consequently, the ambient pressure prevailing outside case 2 is transmitted to exposed surface 22 of sensor 10 passing through orifices 32 of the cap, then over the gap of 0.1 mm between plates 14 and 31, and finally passing through holes 42 of plate 14 to arrive in housing 11 of the sensor. Thus, the whole transmission path of the ambient pressure to exposed surface 22 of the sensor is extremely sinuous. On the one hand, this removes any risk of damaging the sensor by an intrusion of foreign bodies, particularly since the gap between the two plates is very small. Preferably, the thickness of this gap is less than 0.2 mm in order to prevent foreign bodies such as grains of sand entering. On the other hand, this keeps the sensor largely sheltered from external light, such that gel 21 encasing the silicon element does not need to be opaque or coated with an opaque membrane. Of course, transmission of light along the transmission paths of the ambient pressure can be still further reduced if plates 14 and 31 have a dark colour along such paths.

Thus, it will be observed that protective plate 14 forms a screen that is both very efficient and very simple to manufacture and assemble, preventing any intrusion of foreign bodies and the ambient light towards the sensor. A considerable advantage of this type of screen is that it enables orifice or orifices 32 of cap 13 to be positioned opposite exposed surface 22 of the sensor, even at the centre of the cap, which reduces to a minimum the external dimensions of the cap, in the present case its diameter. This aspect is particularly advantageous when the present invention is applied to a wristwatch, since it enables the pressure sensor to be placed discreetly in a flank of the case without damaging the general aesthetic appearance of the watch.

In FIG. 4, it will be noted that the electrical connection between pressure sensor 10 and the main printed circuit board 8 of the watch is accomplished by means of four flexible contact strips 46 which are encased by moulding in a block 47 of synthetic insulating material, and which emerge from the other side of the block in the form of lugs 48 able to be connected by bonding to circuits of board 8. Block 47 is provided with feet 49 for fixing it by heat-welding to plate 50 carrying the movement, as well as other feet that are not shown for positioning it properly with respect to plate 50 and board 8.

Flexible strips 46 extends through aperture 25 and are applied, owing to their elasticity, against contact areas provided on printed circuit 18 back-to-back with sensor 10 which ensures proper transmission of the sensor's electrical output signals even if the latter moves slightly via the effect of a shock. However, the main advantage of this arrangement is that it facilitates assembly of the watch components. For example, pressure sensor 10 can be mounted in middle part 3 of the case and fixed therein by means of cap 13, before the general assembly of the watch is started and in particular assembly of its components in its central cavity 4. During assembly, the electronic module, pre-assembled on board 8, can then be placed in the cavity, such that flexible contact strips 46 will automatically establish proper electrical contact with sensor 10. Conversely, one can choose to place pressure sensor 10 in middle part 3 only after the inner elements of the watch have been assembled, particularly if one wishes to carry out tests using contact strips 46 prior to assembly of the sensor.

Of course, it is also possible to realise the electrical connection between elements 8 and 10 through aperture 25 in another known manner, for example by means of a flat cable to be plugged into board 8.

Although the protective screen described hereinbefore with reference to the drawings is formed by adding a simple perforated plate, it could be accomplished differently without departing from the invention defined by the claims. For example, the protective screen would include two parallel perforated plates spaced apart from each other, the respective holes in the plate being shifted laterally with respect to each other such that an orthogonal projection of the holes from one of the plates onto the other plate is spaced apart from the holes of the latter. In another variant, the protective screen could include a thicker flat element than a simple plate and containing, in its thickness, a plurality of channels extending into its median plane and whose ends open out respectively onto the two faces of said element. One can easily make such an element by assembling two plates of moulded synthetic material, the channels being formed on one face of one of the plates.

The applications of the invention are not limited to the example described hereinbefore, but extend to any portable electronic device including a pressure sensor mounted in a housing that opens out onto an external face of the case of the apparatus, for example an altimeter or a diving computer.

What is claimed is:

1. An electronic apparatus to be worn on the wrist, particularly a wristwatch, including a case and a pressure sensor which is mounted in a housing of the case and has an exposed surface inside said housing for receiving the ambient pressure, said housing opening out onto an external face of the case and being closed on said face by a cap having an external wall provided with at least one orifice in front of the housing for transmitting the ambient pressure from the outside of the case towards the housing, wherein said external face of the case is located on a side of the case which is not in contact with the wearer's wrist and wherein at least one protective screen is arranged in the housing behind said orifice or orifices of the cap so as to prevent any straight line communication between said orifice or orifices of the cap and the exposed surface of the pressure sensor, such that any transmission path of the ambient pressure to the exposed surface of the pressure sensor is sinuous.

2. The apparatus of claim 1, wherein the protective screen includes a perforated plate extending substantially parallel to said wall of the cap, the holes of the perforated plate being shifted laterally with respect to each orifice of the cap such that an orthogonal projection from said orifice or orifices onto the perforated plate is spaced apart from the holes therein.

3. The apparatus of claim 1, wherein the protective screen includes two parallel perforated plates spaced apart from each other, the respective holes in the plates being shifted laterally with respect to each other such that an orthogonal projection from the holes of one of the plates onto the other plate is spaced apart from the holes in the latter.

4. The apparatus of claim 2, wherein the protective screen is mounted on an inner face of the cap and includes on its periphery notches arranged to engage on positioning shoulders forming part of the cap.

5. The apparatus of claim 3, wherein the protective screen is mounted on an inner face of the cap and includes on its periphery notches arranged to engage on positioning shoulders forming part of the cap.

6. The apparatus of claim 2, wherein the distance between the protective screen and said wall of the cap is less than 0.2 mm.

7. The apparatus of claim 3, wherein the distance between the protective screen and said wall of the cap is less than 0.2 mm.

8. The apparatus of claim 1, wherein at least one of the orifices of said cap is located in a central region of the cap, located opposite the exposed surface of the pressure sensor.

9. The apparatus of claim 2, wherein at least one of the orifices of said cap is located in a central region of the cap, located opposite the exposed surface of the pressure sensor.

10. The apparatus of claim 7, wherein at least one of the orifices of said cap is located in a central region of the cap, located opposite the exposed surface of the pressure sensor.

11. The apparatus of claim 1, wherein the pressure sensor includes a pot-shaped structure including a substantially flat substrate and a cylindrical lateral wall which surrounds said exposed surface of the pressure sensor, wherein the housing is delimited laterally by a circular projecting wall, an O-ring sealing gasket being radially compressed between said projecting wall and the cylindrical side wall of the pressure sensor, and wherein the cap covers said projecting wall on the side of the exterior of the case and is arranged to hook onto said wall.

12. The apparatus of claim 7, wherein the structure of the pressure sensor is retained in the housing by its cylindrical side wall abutting against the cap or against the protective screen.

13. The apparatus of claim 1, wherein the housing is separated from a central cavity of the case by a bottom wall having an aperture for the passage of flexible contact strips of an electronic module arranged in said central cavity, said strips pressing against contacts connected to the pressure sensor.

* * * * *